United States Patent [19]

Cochennec

[11] 4,366,566

[45] Dec. 28, 1982

[54] SYSTEM FOR INTERCONNECTING SUBSCRIBERS LINES TO AN AUTOMATIC DIGITAL TELEPHONE SWITCHING SYSTEM

[76] Inventor: Jean-Yves Cochennec, Rue de Kervenez, 22560 Trebeurden, France

[21] Appl. No.: 100,008

[22] Filed: Dec. 4, 1979

[30] Foreign Application Priority Data

Aug. 12, 1978 [FR] France .............................. 78 35483

[51] Int. Cl.³ .......................................... H04Q 11/00
[52] U.S. Cl. ........................................ 370/53; 370/67
[58] Field of Search ...................... 370/58, 56, 62, 53, 370/67

[56] References Cited

U.S. PATENT DOCUMENTS

| Re. 28,097 | 8/1974 | Nordquist et al. | 370/62 |
| 3,760,103 | 9/1973 | Condon | 370/58 |
| 3,914,559 | 10/1975 | Knollman | 370/62 |
| 4,021,619 | 5/1977 | Potter et al. | 370/56 |

FOREIGN PATENT DOCUMENTS

| 2323544 | 11/1974 | Fed. Rep. of Germany | 370/58 |
| 2741816 | 3/1978 | Fed. Rep. of Germany | 370/58 |

Primary Examiner—Douglas W. Olms
Attorney, Agent, or Firm—Laff, Whitesel, Conte & Saret

[57] ABSTRACT

In the interconnection system between telephone subscribers lines and digital telephone electronic switching equipment, individual subscriber equipment is associated with each line, which is comprised of means for providing conventional line interface functions and also a conventional two-four wire differential coupler. The four wire output of the coupler is liked to an A/D and D/A converter whose digital output is connected to an output multiplex and digital input to an input multiplex. Each individual equipment has an outgoing and return route allotted in both the input and output multiplexes. The input and output multiplexes or time shared data busses are multiplied to the inputs and outputs of a plurality of basic digital switches connected by two-way digital multiplexes or data busses.

5 Claims, 11 Drawing Figures

SYSTEM FOR INTERCONNECTING SUBSCRIBERS LINES TO AN AUTOMATIC DIGITAL TELEPHONE SWITCHING SYSTEM

The present invention relates to an interconnection system for connecting telephone subscribers lines to automatic digital telephone switching system.

At the present time, the connection of telephone subscribers lines in an automatic telephone switching system, which may be electromagnetic, space or time division, is achieved through the use of an "input distributor frame" which interfaces between the telephone distribution network and the switching stages. For more details on these distribution frames and in particular a description of the input distribution frames one can refer to the work of A. Delbouys, M. Durand, A. Campien and J. Monfort in Chapter VII, pp. 5-11 of their book "Cours de Telephonie Generale" published in 1970 by "l'Administration Des Postes et Telecommunications." In practice an input distribution frame is formed as a two-sided structure. On one side are found the vertical terminal posts to which the subscribers lines are physically connected and on the other side are found the horizontal terminal posts from which the link-up cables go to the switching stages. The two faces of the structure are connected together by flexible garter type strapping.

At the input distributor level, the following functions are provided:

interconnection on the vertical terminal posts of subscribers lines coming from the distribution network, establishment on the cable heads, that is on the vertical head side, of secondary protection units, in general lightning arrestors for overhead and mixed underground and overhead lines.

conversion of subscribers lines from a geographic to a numerical organization, that is a translation of equipment number connected to both lines, i.e. to the vertical terminal posts of the distribution frame into a directory number which is linked via the internal structure of the switching system to the horizontal terminal posts by garter type strapping.

distribution by mixing subscribers lines between vertical and horizontal terminal posts for the purpose of:

evening out the traffic going to the different stages of the switching system, performing transfers, that is allowing a subscriber to keep the same directory number at the same interconnection level after moving to a new region of town, supplying break points in subscribers lines for the purpose of:

line isolation, the connection of line usage checking equipment.

insertion of peripheral equipment such as repeaters, line equalizers, etc. in the lines.

With prior art distribution frames junction cables between the input distribution frame and the interconnection stages of the associated automatic switching equipment carry analog signals. Thus in these cables there are as many pairs as there are linked subscribers. At their entry in the automatic switching equipment, the lines coming from the distribution frame go to junctors which perform the interface, that is, supply the power, ring the bell, detect receiver offhook conditions, etc.

Now, at the subscriber selection stages, the subscriber traffic is concentrated before reaching the smaller group selection stages, where the size is also reduced. In the digital automatic switching equipment, that is, the automatic switching equipment to which the connection network interconnects pulse code modulated or PCM channels, the analog to digital conversion is performed with multi-channel encoders after concentration, and the conversion back from digital to analog is done before deconcentration (expansion). In general, one encoder is associated with a first order PCM multiplexer and encodes to its respective 30 channels.

In practice, we know that the size of such an input distribution frame requires a building with a high ceiling clearance and a substantial floor area. Thus the management and maintenance of such a distribution frame requires a significant amount of manpower, leading to a considerable expenditure. Such distribution frames become extremely complex for capacities exceeding 20,000 lines. Statistics show that due to the inherent modularity of the equipment only 80% of the subscriber equipment installed is used effectively.

One object of the present invention is to provide a system to interconnect subscribers lines with an automatic digital electronic telephone switch, which occupies a much smaller volume than conventional distribution frames stations of equal capacity and furthermore allows the removal of the garter strapping thus considerably reducing the required manpower and reducing the interconnection modules installed for a single subscriber, and which eliminates completely unused subscriber equipment.

Furthermore, an object of the present invention is to provide an interconnection system for which manual maintenance is reduced to the removal and insertion of plug-in modules.

As one feature the present invention, a system is provided to interconnect telephone subscriber lines to an automatic digital electronic telephone switching system. Associated with each subscriber's line is individual subscriber equipment for providing conventional line interface functions and also a conventional differential two-four wire coupler whose four wire output is connected to an analog/digital and digital/analog converter. The digital output of the converter is connected to an outgoing multiplex channel and the digital input of which is connected to an incoming multiplex channel. Each individual subscriber equipment has an allocated incoming and outgoing multiplex channel. The incoming and outgoing multiplex channels are respectively coupled to corresponding inputs and outputs of a group of basic digital switches of which each is connected by a two way linking multiplex to a digital switching stage of an automatic time division switching system. Each basic digital switch switches, in a permanently programmable manner, one outgoing channel from an incoming multiplexer and one outgoing channel to a linking multiplexer and conversely one return channel from the outgoing multiplexer to one return channel from the linking multiplex.

According to another characteristic, each individual subscriber equipment is a circuit mounted on a printed circuit board which is plugged into a backplane which is connected on one hand, to at least one distribution cable for subscribers lines, and on the other hand, to multiplex link connectors. The backplane also has plug-in connectors for the basic digital switches and the connectors for line protection modules in addition to those intended for individual equipment plug-in boards. The backplane is initially constructed with all its connectors, the number of which that are being used corresponds to the entry into service of lines from the distribution cable.

According to another features, each individual subscriber equipment is a circuit carried on print circuit cards which carry modulator-demodulators for carrier lines, which may be plugged in, instead of individual subscriber equipment. Each modulator-demodulator card has one connector into which may be plugged one individual subscriber equipment card, and outputs that may be connected by a flexible connection to an individual subscriber card connector.

According to another feature, each individual subscriber equipment card has one connector into which may be plugged one special purpose circuit card depending on the class of the subscriber.

The characteristics of the above mentioned invention, as well as others will become clearer upon reading the description of the design examples, the details of which are given with the aid of the following figures.

Figure 1:
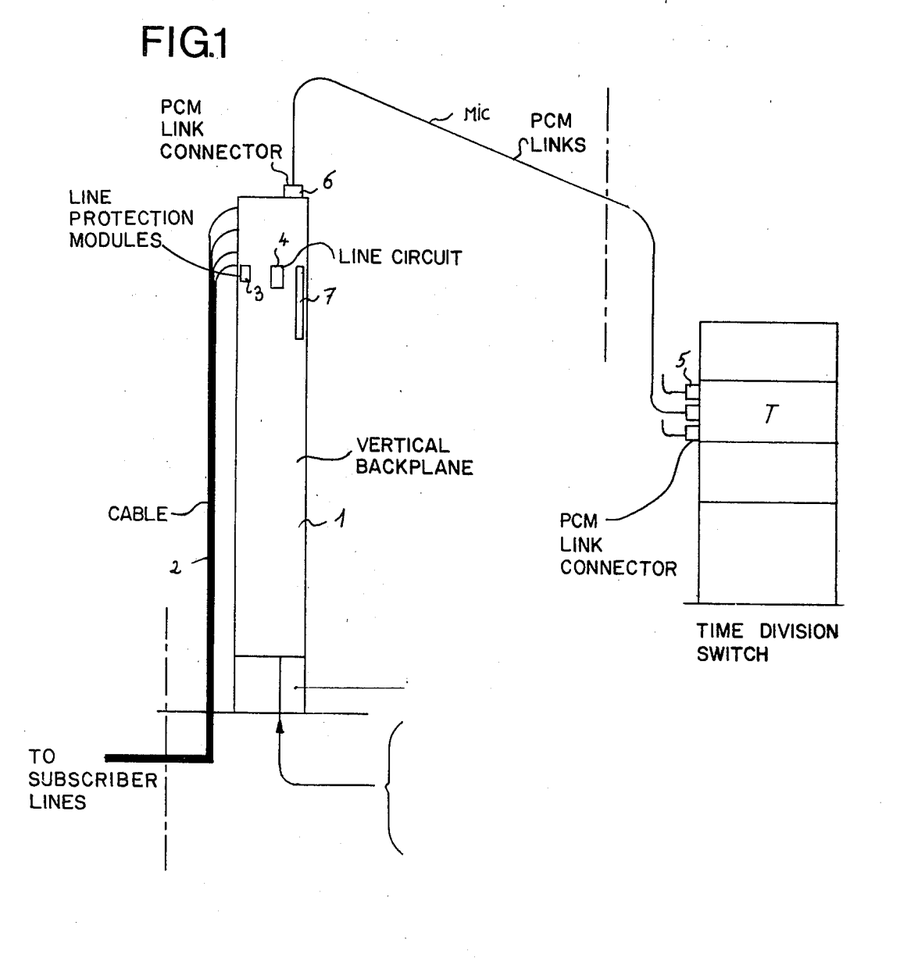
FIG. 1 is a schematic diagram of an interconnection system, according to the present invention, connected on one hand to subscribers lines and on the other hand to a T stage of a digital (time division) switching network of the TST type.

The interconnection system shown in FIG. 1, is comprised of a vertical back plane 1 which is connected on one hand to the telephone subscriber network cables 2 and on the other hand to the first T stage of a convention TST type digital (time division) switch via PCM links.

On back plane 1 will be found various plug-in modules of different kinds such as the individual line protection modules 3, incorporating lightning arrestors, modules 4 being referred to as "individual subscriber equipment" for each subscriber's line. Before describing module 4 or individual subscriber equipment in greater detail, we shall indicate that the introduction of individual subscriber equipment is unusual at this level of switching, since we know that it performs the following functions:

line interface functions, that is, to supply power to the line, to detect lifting of telephone receiver, voltage surge protection, the transmission of ringing, conversion from two to four wire and vice-versa, connection of centralized test apparatus; all of which is done at the subscriber junctor.

analog/digital conversion and vice-versa performed in a single channel coder-decoder, and associated related functions such as analog filtering, sampling, demodulation and compression, such that the signals exchanged between the backplane and the digital T stage are PCM coded following the CCITT recommendations and A regulations.

The PCM links are, on one hand, connected by conventional connectors 5 to the T stage and on the other hand by the connectors 6 to the backplane 1. In practice the PCM links are grouped by 7 into a suitable cable. Basic digital switches are inserted between the connectors 6 and the equipments 4.

Figure 2:
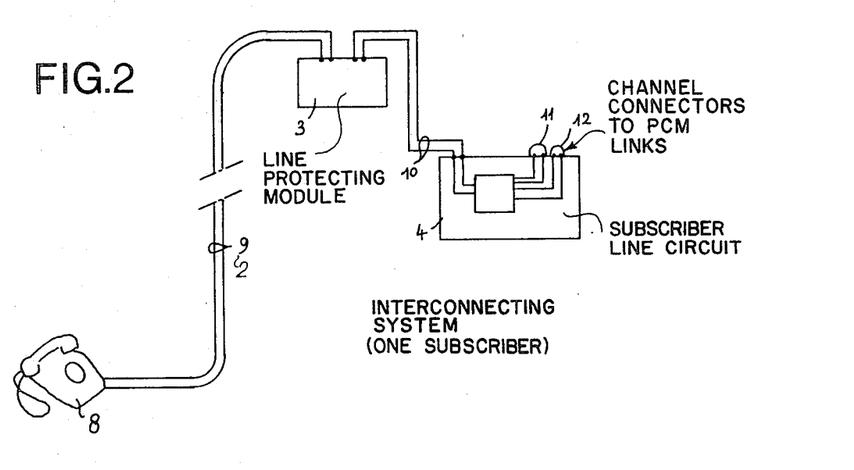
FIG. 2 is a schematic block diagram of the circuits of the interconnection system mounted on a subscriber's line.

As shown in the schematic of FIG. 2, in the interconnection system of the invention; one telephone subscriber station 8 is connected, via one pair 9 in one cable 2 capable of containing up to 112 pairs, one protection module 3, two wires 10, to the analog input of a subscriber's equipment 4 of which one digital input 11 is connected to a PCM receiving multiplex channel and of which one digital output 12 is connected to a PCM transmission multiplex channel.

Figure 3:
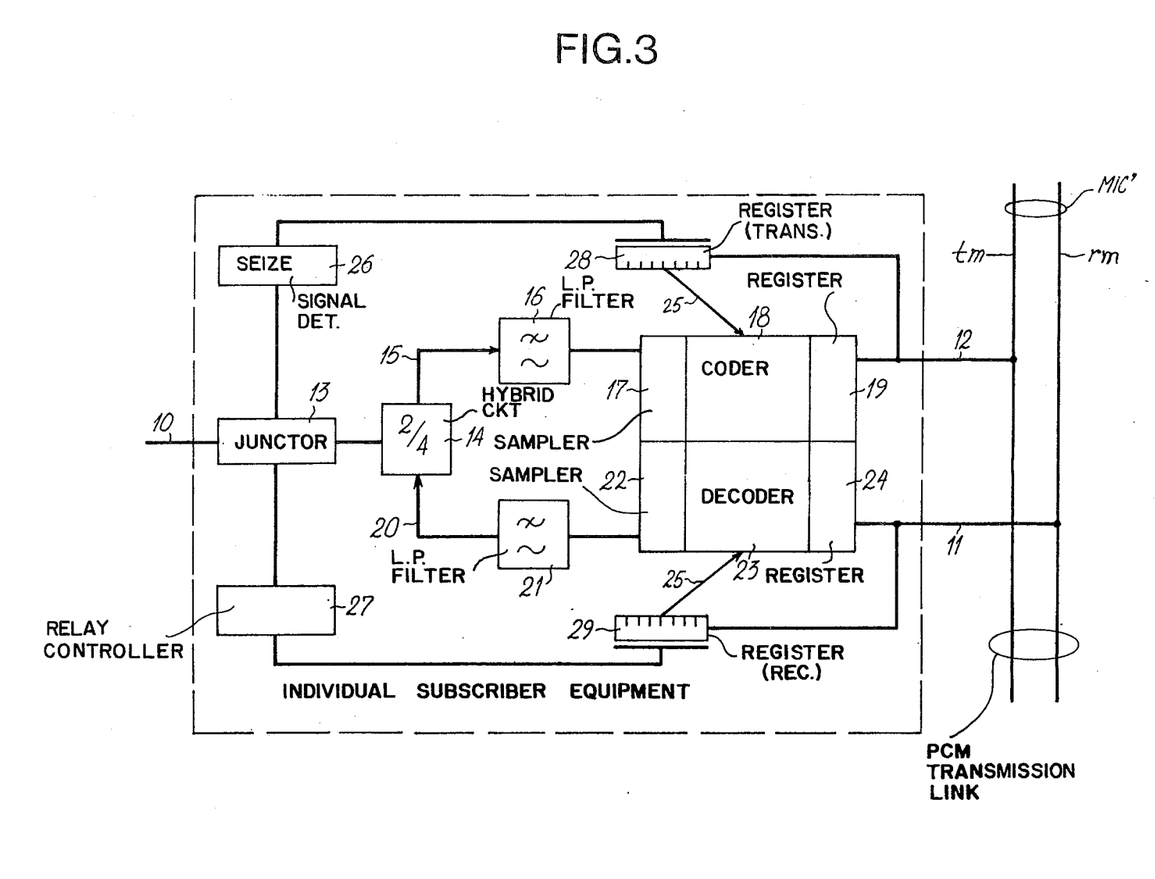
FIG. 3 is a block diagram of the individual subscriber equipment shown in FIG. 2.

The individual subscriber equipment shown in FIG. 3 is comprised of one junctor 13 connected on one hand to the wires 10 and on the other hand to the two input-output wires of a 2/4 wire hybrid or conventional differential coupler 14. The output 15 from the hybrid 14 is connected to the input of a low-pass filter 16. The output of the filter 16 is connected to the input 17 of a blocking sampler whose output is connected to the input of a coder 18, the output of which is connected to a register with output 19. The input 20 of the hybrid 14 is connected to the output of a low-pass filter 21 whose input is connected to the output of a blocking sampler 22 which has its input connected to the output of a decoder 23, the input of which is connected to the output of register 24. In practice, the blocking samplers 17 and 22, the coder 18, the decoder 23 along with the registers 19 and 24 are conventional circuits mounted as a group of integrated circuits commercially available under the name of "Half-Duplex PCM CODEC" presently manufactured by various American companies.

In the conventional case of 8 kHz sampling, the voice transmission filter 16 is a 2nd order analog filter while filter 21 is a 6th order analog filter.

The output of register 19 is connected to the digital output 12 which is itself connected to a PCM transmission multiplex line tm while the input of register 24 is connected to the digital input 11 which is connected to a PCM receiving multiplex rm; the tm and rm multiplex taken together constitute what is known as a PCM link. It is understood that the group of circuits 17, 18, 19, 22, 23 and 24 receive through a link shown as 25 an 8 kHz timing signal to control on one hand the input to the tm and on the other hand the selection of samples received from the rm.

The individual subscriber equipment of FIG. 3 furthermore is comprised of seizure circuit 26 within junctor 13 upon detection of signalling coming from subscribers line 9, and a control circuit 27 to activate the appropriate relays of junctor 13 depending upon the signal received from the multiplex rm. The seizure circuit 26 is connected to the input of a register 28 which receives a clock signal at 25 and which is connected to output 12 in order to insert signalling within the digitized channel, as reserved by the multiplex tm. The control circuit 27 is connected to the output of a register 29 which receives a clock signal at 25 and whose input is connected to input 11 in order to receive signalling transmitted within the digitized channel reserved by the multiplex rm and intended for the appropriate equipment.

As we shall see in greater detail later, the signal transmitted by seize circuit 26 contains information about the state of the subscriber's loop or the result of an attempted call while circuit 27 allows for the control within junctor 13 of components such as the ringing relay, incompleted call relay or the third wire or polarity reversal relay if the individual subscriber has the corresponding modules.

Figures 4, 5:
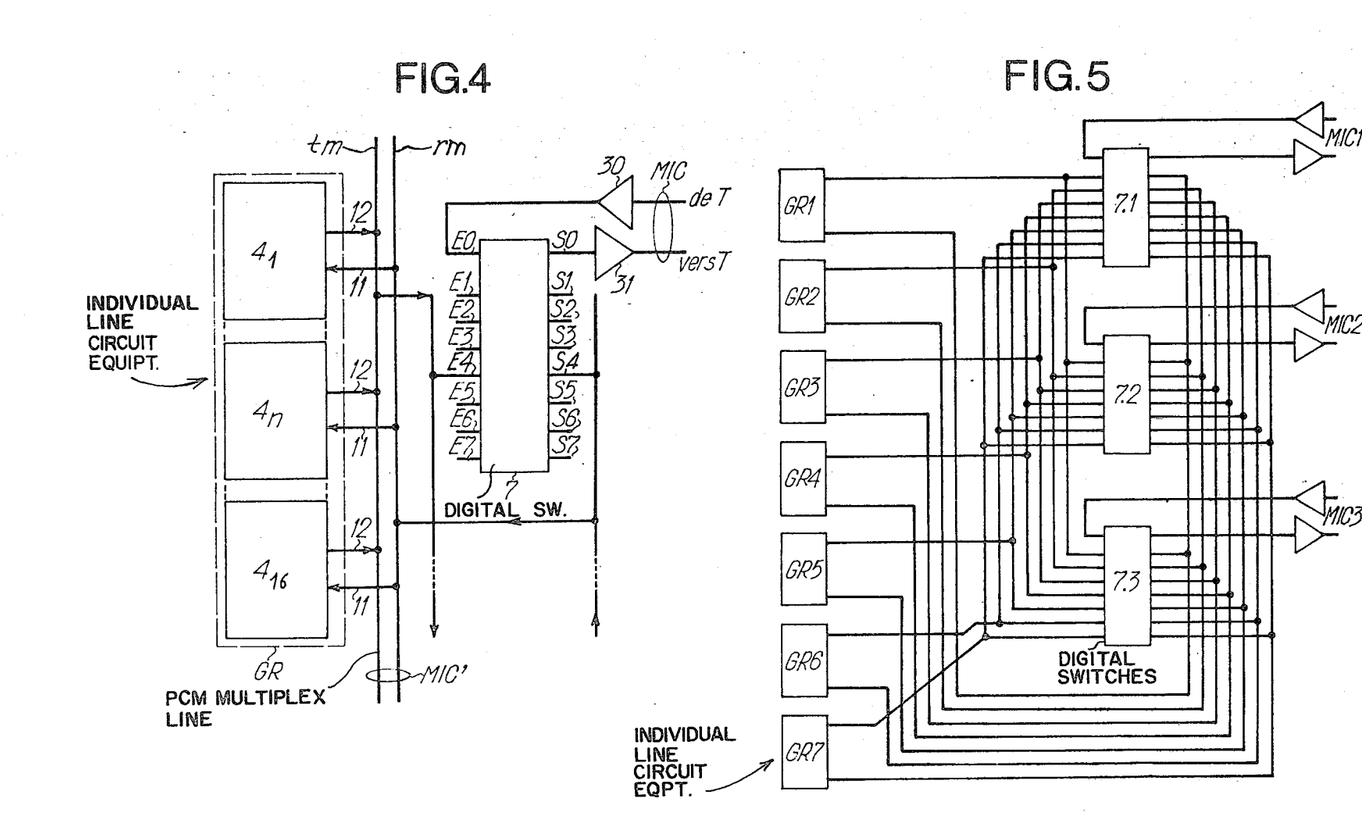
FIG. 4 is a block diagram illustrating the digital connections of the individual subscriber equipment shown in FIG. 3.
FIG. 5 is a block diagram of the digital connections of the individual equipment groups.

It is shown in FIG. 4 how the individual line equipments 4.1, 4.2, 4.n, . . . 4–16 of a GR group of 16 individual line equipments are connected by their respective inputs and outputs 11-12 to a bidirectional PCM multiplex. The tm multiplex highway is connected to one input of the basic digital switch 7 while the rm multiplex highway is connected to the output of the same rank of switch 7. The switch 7 consists of: for example; eight input-output pairs numbered E0–E7 and S0–S7 respectively, among which input E0 is connected to an incoming PCM multiplex highway from stage T, and output S0 is connected to an outgoing PCM multiplex highway to stage T. The other inputs E1 to E7 are respectively connected to tm multiplex sent from the equipment 4, and the outputs S1 to S7 are connected to the corresponding rm multiplex highway. In FIG. 4, the GR group tm and rm multiplex shown are respectively connected to E4 and S4. The amplifiers 30 and 31 can also be expected on PCM links with the T stage, these also being mounted on backplane 1.

Each basic digital switch 7 has the logical means to directionally switch a PCM line, entering at E0, to one of the outputs S1 to S7 in a time slot allocated to equipment 4, whose rm multiplex is tied to the chosen output. Conversely, the corresponding line in the corresponding tm multiplex is directionally switched by the logical means of switch 7 to a corresponding line of the PCM which has its output at S0. It should be noted that both PCM and PCM' multiplexes have the same handling capability. The structure of switch 7, adapted to directionally switch each channel from one multiplex to another multiplex's channel, with a permanent correspondence between the two channels, is very simple. Practically, it is this permanent correspondence that, digitally, replaces the garter type strapping or jumper wire connections of spatial distribution frames.

In FIG. 5, we have considered a case where, on a backplane 1, we had seen 7 groups GR1 to GR7, each having in principle 16 individual subscribers' equipments, but not having, for example, more than 90 sets of equipment for the whole of the 7 groups, where the TM and RM multiplexes are effectively tied to the inputs and the outputs of three basic digital switches 7.1 to 7.3, each respectively tied to the T stage by three multiplexes PCM1 to PCM3. However, this number of 3 basic switches is not limited. We can modify the correspondence, which is said to be permanent, as mentioned above, by modifying an address in the switching memory of a basic digital switch, thereby changing a garter strap. It appears therefore that the three basic digital switches permit a great flexibility in serving more profitably the subscriber's various needs.

In practice, the subscriber's lines 9 of the distribution cable 8 are firmly fixed to each backplane. When a line is assigned to a subscriber, a protection module 3 and an individual subscriber's equipment module 4 are inserted into the two corresponding slots of the backplane. Therefore, as each individual line is assigned to a subscriber, the backplane becomes filled with these insertable modules. The cables 2 which carry the subscriber's lines undergo generally, a certain amount of splitting before arriving at the subscriber. It can then be said that the subscribers are randomly distributed in the cable and also on the backplane itself, where the individual equipment occupies no predetermined slot. To avoid the requirement that random filling of the distribution cables would cause a situation in which a small number of subscribers would require equipping the whole backplane of PCM multiplex links to the T stage, the basic switches 7 permit a smooth distribution of the digital channels from equipment 4 to the PCM multiplexes. Therefore, PCM multiplexes are better loaded, which is important in a system with no concentrator network.

The basic digital switches provide, therefore, a means for switching the digital channels coming from the equipment of groups GR1 to GR7 on the PCM.1 to PCM.3 multiplexes as the subscribers are connected together, so that the first subscribers randomly linked up on the backplane may be switched firstly by the first switch 7.1 on the first multiplex PCM.1 until it is filled, then the next subscribers via 7.1 to PCM.2 until it is filled and so on. This has the advantage of using only the number of PCM multiplexes necessary for the traffic of the subscriber actually linked to the backplane. These switches also permit a reconfiguration of the backplane in the case of a PCM multiplex breakdown or, in general, common equipment for multiple subscriber units such as a basic digital switch or an amplifier 30 or 31. Should such equipment break down, one can effectively switch the corresponding subscribers to another PCM multiplex. For this purpose, one can foresee that one free PCM multiplex per backplane should be provided.

In practice, each basic digital switch is mounted on an individual plug-in card which is comprised as well of the amplifiers 30 and 31, and eventually, code conversion devices should the distance of the backplane to the TST connection network require it.

The switches also permit the allocation to subscriber equipments 4 of a certain number of digital channels on the associated PCM multiplex, these digital channels being possibly consecutive, as would be the case in a multiservice network. One must note that the backplane of the switching system of the invention is particularly adaptable to this type of network, since it permits the allocation of individual subscriber services, not only on a digital channels level, but also at the individual subscriber's equipment level.

Figure 6:
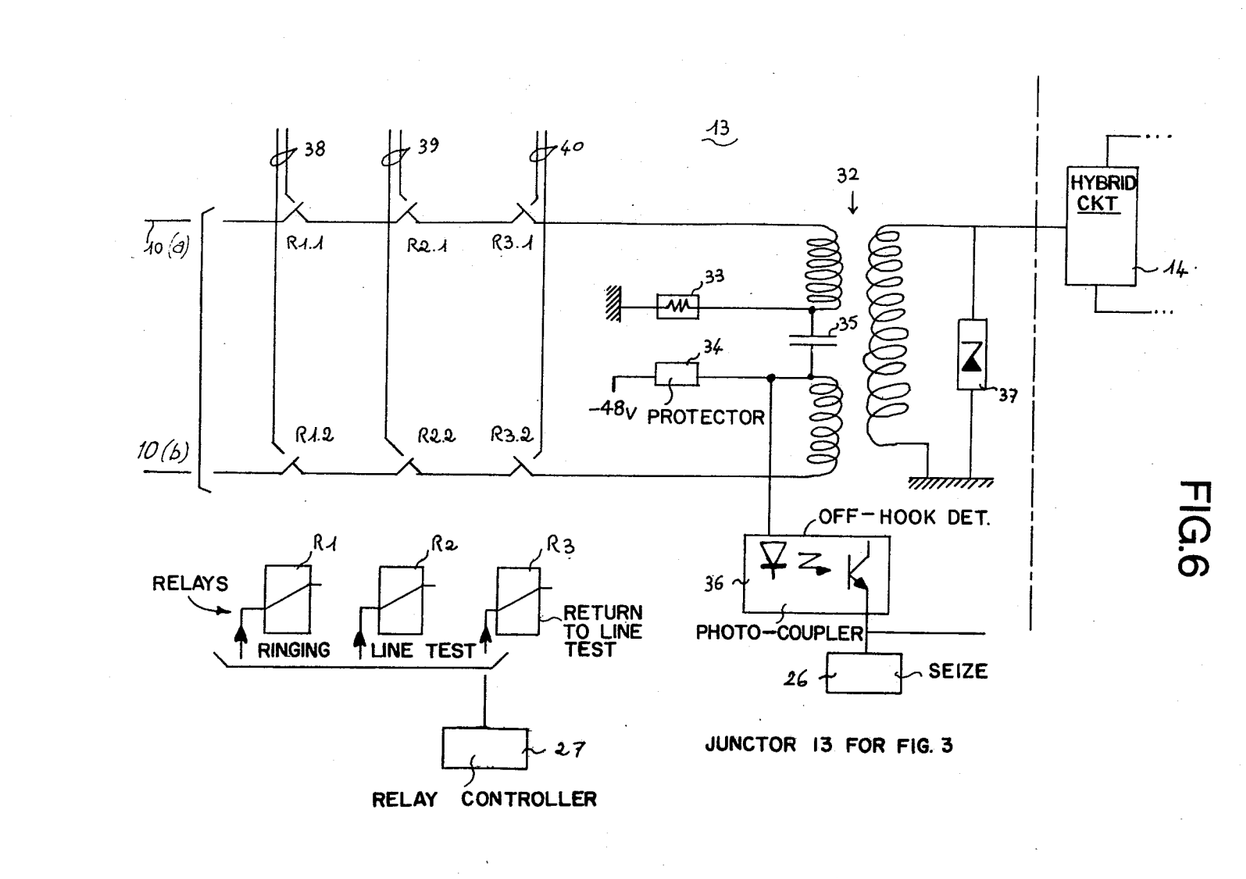
FIG. 6 is a schematic of a junctor used in the individual subscriber equipment shown in FIG. 3.

In FIG. 6 is shown the schematic diagram of a junctor 13 from individual subscriber's equipment 4, FIG. 3. In the pair of wires 10, the wire a is connected to ground through the intermediate contact of inverter R1.1, the intermediate contact of contacts R2.1, the intermediate contact of contacts R3.1 the first primary winding of a conventional translator (transformer) 32, and the line current limiting resistor 33. The wire b is connected to the −48 V battery, through the intermediate contact of contacts R1.2, the intermediate contact of contacts R2.2, the intermediate contact of contacts R3.2 a second primary winding of translator 32, and a protection component 34 for avoiding voltage surges. A capacitor 35, for example of 2.2 microfarads, is mounted between the primary windings to achieve low frequency decoupling. The junction of the second primary winding 32 and component 34 is connected to a photocoupler 36 whose output is connected to the input of the seizure circuit 26. The photocoupler 36 is able to recognize the state of a subscriber loop. The secondary winding of translator 32 has one lead connected to ground and the other connected to the input of the 2 wire/4 wire hybrid circuit 14; a protective zener diode 37 is connected in parallel with this secondary winding.

The output of control circuit 27 is made up of three wires which are connected to three relays R1, R2 and R3. The energization of relay R1 activates contacts R1.1 and R1.2 to send down the line the ringing current through a pair of wires 38. Energizing relay R2 activates contacts R2.1 and R2.3 to return line a and b to the line test circuit via pair 39. Energizing relay R3 activates contacts R3.1 and R3.2 to return line a and b to the line test circuit via pair 40. Thus it is apparent that depending on the signalling received in register (FIG. 3) 29 and translated in 27, switching relays may or may not be activated. Finally, the status of the subscriber's receiver, be if off hook or not, is detected by 36 which relays the information to 26 which inserts through register (FIG. 3) 28 the respective signalling into the multiplex.

Figure 7:
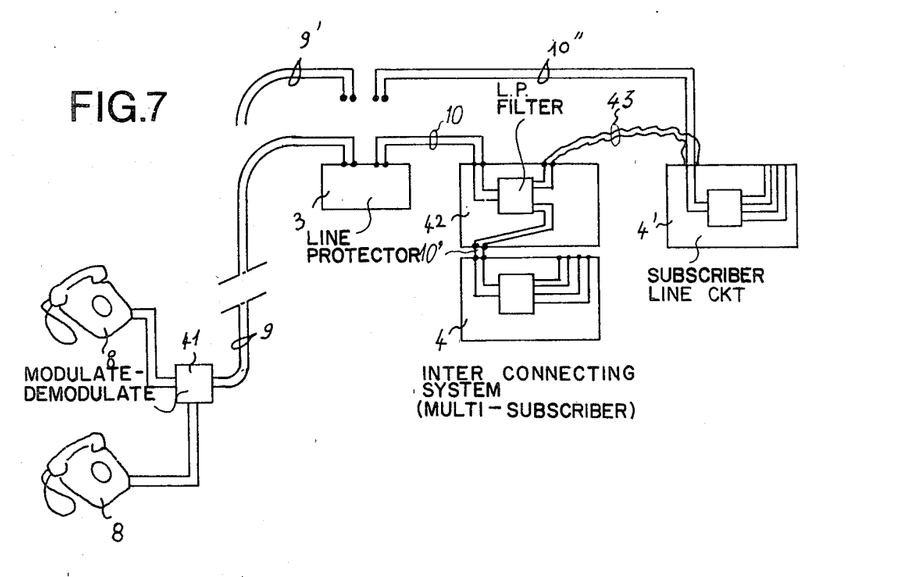
FIG. 7 is a schematic block diagram of the interconnection circuits set-up on one subscriber's line to carry current intended for two subscribers.

FIG. 7 displays the case in which a subscriber line 9 is connected to a backplane 1 to carry current of the SPAX or PPT type. Close to two identical subscriber stations 8 and 8' a modulation-demodulation module 41 is mounted, connected between 8 and 8'. On the backplane side, line 9 is always connected to a protective mechanism 3 whose wires from output 10 are connected to the input of a modulation-demodulation card having an appropriate filter, of which one pair of output wires 43 is connected to the input of one conventional subscriber card 4' and another pair of output wires 10' is connected to the input of another individual subscriber equipment card. Since card 4' is plugged-in, in practice its analog input is connected to an open pair 10" since the corresponding protective circuit 3 is not plugged-in. In practice, card 42 which carries the filter is plugged into the location of the conventional individual equipment, and card 4 is simply plugged into card 42 which has connectors for this purpose. The wire jumpers 43 are soldered as the need arises. One should note that this type of interconnection is extremely simple to implement since it consists of removing one double strap besides the insertion of simple plug-in modules.

According to this invention the present interconnection system allows through the use of special plug-in modules for individualized subscriber services such as wire c equipment, reverse polarity subscriber equipment or remote billing service.

Figure 8:
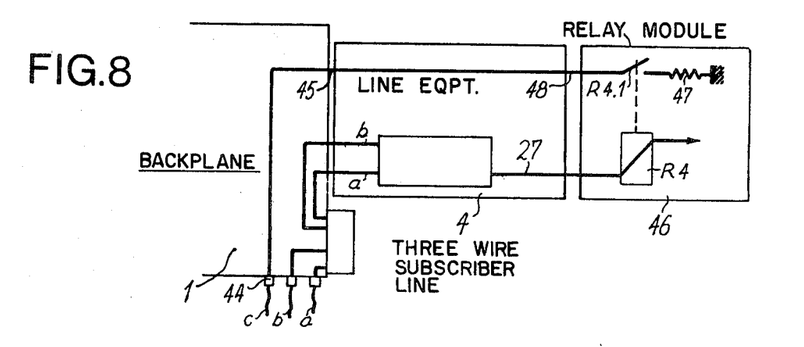
FIG. 8 is the schematic of an interconnection circuit associated with individual subscriber equipment for a three wire connection.

In FIG. 8 the case of a 3 wire interconnection is represented. In fact, this differentiation is reserved for the (telephone company) Administration's needs for links between actives of automatic subdistribution frames and automatic switching equipment. This allows the use of signalling which consists of connecting wire c to ground through a resistor of less than 100 ohms.

Between the actives of the automatic subdistribution frames and the backplane 1 of the automatic switching equipment, interconnection is made with triplex cables. A third terminal is required on the backplane in 44, and the backplane rear cabling ties it to the terminal of the corresponding individual subscriber's equipment 4. That is the case for all the backplanes and for all the equipment 4. For the general case, which does not have the third wire, the third terminal 45 on module 4 remains unused.

In the equipment 4, a specified wire c crosses the card on which is inserted a card 46 which has one moving contact R4.1, for which the fixed contact is connected to ground by resistor 47 of less than 100 ohms and the moving contact is connected to terminal 48 which is connected to wire c of 4. Module 46 also has a relay R4 which has its excitation circuit connected to the output of 27 of card 4 when 46 is plugged-in.

Figure 9:
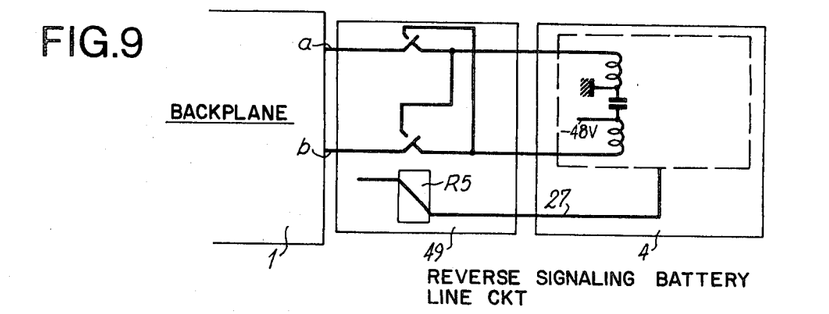
FIG. 9 is the schematic of an interconnection circuit associated with individual subscriber equipment intended for a reverse battery line.

In FIG. 9, we have shown a polarity reversing module card 49 plugged-in to the frame of backplane 1, to which a conventional card 4 is plugged-in. Card 49 is inserted in the place of card 4. Card 49 is comprised of an inverting relay R5 associated with a set of conventional inverting contacts mounted on wires a and b, and extending to card 4. The relay R5 is activated by a wire which is connected to control circuit 27, shown in FIG. 3.

It should be noted that signalling with polarity reversal is used mainly by public telephone booths and operators.

Figure 10:
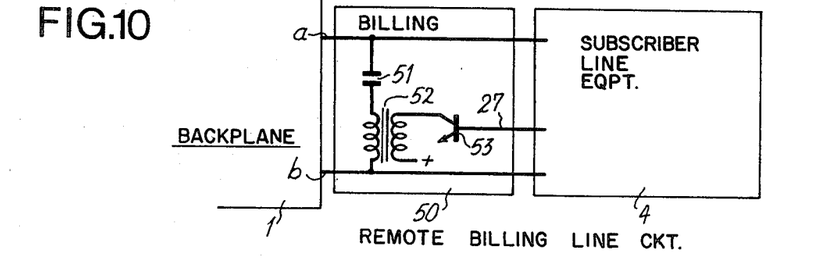
FIG. 10 is the schematic of an interconnection circuit associated with individual subscriber equipment for a subscriber receiving remote billing.

In FIG. 10, we have shown inserted in the frame of backplane 1, a remote billing module card 50 in which is inserted a conventional card 4. Card 50 is inserted in place of card 4. It has a circuit, connected between wires a and b, having a capacitor 51 and the secondary of transformer 52 of which the primary is part of an oscillating circuit with transistor 53 whose base may be controlled by a wire connected to the control circuit 27.

Module 50 is crossed by wires a and b. It allows the the transmission, on line 9, of calibrated pulses at a rate proportional to the line charge causing advancement of a subscriber's counter. The signal used is at a frequency of 12 kHz provided by the oscillator 53.

Figure 11:
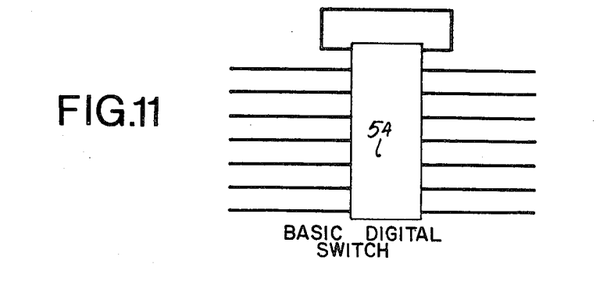
FIG. 11 is a schematic block diagram illustrating how a basic digital switch is used with individual subscriber equipment to establish local communictions by looping.

In FIG. 11, we have shown a basic digital switch 54 which is used to establish, for example on a distant backplane, a local call by looping output 50 to input E0 with a multiplex link.

What is claimed is:

1. A system for cross connecting individual subscriber line circuits to their assigned positions in a digital switching system, said digital switching system comprising a plurality time division multiplex switches interconnected by incoming and outgoing time division highways, said switches being connected in multiple to said highways, each of said subscriber line circuits comprising means individually associated with each of said subscriber lines for performing interfacing functions, two-to-four wire differential coupling means having its four wire side coupled to analog-to-digital and digital-to-analog converter means, a digital output on said converter means being connected to an outgoing highway means, a digital input on said converter means being connected to an incoming highway, means for allocating to each of said line circuit means one incoming and one outgoing channel on said incoming and outgoing highways, and digital switch means for programming interconnections between said incoming and outgoing channels.

2. A system as defined in claim 1 in which each individual subscriber line circuit is a circuit mounted on a printed circuit board which is plugged into a backplane, chassis, said chassis being connected on one hand, to at least one distribution cable for subscribers lines, and on the other hand, to multiplex link connectors, the backplane chassis also having plug-in connectors for the digital switch means and connectors for line protection modules, the backplane being initially constructed with all of its connectors, the number of said connectors corresponding to the entry into service of lines from the distribution cable.

3. A system as defined in claim 1 or claim 2 in which printed circuit cards carry modulator-demodulators means for carrier current used on lines which may be plugged-in to the connectors for the individual subscriber circuits, each modulator-demodulator card comprising one connector into which may be plugged one individual subscriber line circuit card, and said modulator-demodulator having outputs that may be connected by flexible connections to an individual subscriber card connector.

4. A system as defined in claim 1 or 2 in which each individual subscriber equipment card has one connector into which may be plugged-in one special purpose circuit card depending on the class of subscriber.

5. A system as defined in claim 3 in which each individual subscriber equipment card has one connector into which may be plugged-in one special purpose circuit card depending on the class of subscriber.

* * * * *